(12) United States Patent
Iezaki

(10) Patent No.: US 9,651,785 B2
(45) Date of Patent: May 16, 2017

(54) DISPLAY SYSTEM, PORTABLE DISPLAY DEVICE, DISPLAY CONTROL DEVICE, AND DISPLAY METHOD

(71) Applicant: Seiko Epson Corporation, Tokyo (JP)

(72) Inventor: Hiroshi Iezaki, Sapporo (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/001,586

(22) Filed: Jan. 20, 2016

(65) Prior Publication Data

US 2016/0219165 A1 Jul. 28, 2016

(30) Foreign Application Priority Data

Jan. 26, 2015 (JP) .................................. 2015-012009

(51) Int. Cl.
| | | |
|---|---|---|
| *H04N 1/04* | (2006.01) | |
| *G02B 27/01* | (2006.01) | |
| *G03G 15/00* | (2006.01) | |
| *G06F 3/01* | (2006.01) | |

(52) U.S. Cl.
CPC ....... *G02B 27/0172* (2013.01); *G02B 27/017* (2013.01); *G03G 15/5016* (2013.01); *G06F 3/011* (2013.01); *G02B 2027/014* (2013.01); *G02B 2027/0187* (2013.01)

(58) Field of Classification Search
CPC .............. G02B 27/0172; G02B 27/017; G02B 2027/014; G02B 2027/0187
USPC ........................................ 358/1.15, 1.9, 474
See application file for complete search history.

(56) References Cited

U.S. PATENT DOCUMENTS

| | | | |
|---|---|---|---|
| 6,750,878 B1 | 6/2004 | Tatsuo et al. | |
| 8,847,953 B1* | 9/2014 | Cho | ..................... B29C 67/0085 |
| | | | 345/419 |
| 2005/0024388 A1 | 2/2005 | Takemoto | |
| 2007/0198571 A1 | 8/2007 | Ferguson et al. | |
| 2007/0201884 A1 | 8/2007 | Yamada | |
| 2011/0254859 A1 | 10/2011 | Matsuda | |
| 2012/0192077 A1 | 7/2012 | Castellani et al. | |
| 2013/0027430 A1 | 1/2013 | Matsuda et al. | |
| 2014/0240347 A1* | 8/2014 | Murakami | ........... G02B 27/017 |
| | | | 345/629 |
| 2014/0285521 A1 | 9/2014 | Kimura | |
| 2014/0327603 A1 | 11/2014 | Hiraide | |
| 2015/0002394 A1* | 1/2015 | Cho | ................... G02B 27/0093 |
| | | | 345/156 |

(Continued)

FOREIGN PATENT DOCUMENTS

| | | |
|---|---|---|
| JP | 2004-233201 A | 8/2004 |
| JP | 2005-049996 A | 2/2005 |

(Continued)

*Primary Examiner* — Houshang Safaipour
(74) *Attorney, Agent, or Firm* — Harness, Dickey & Pierce, P.L.C.

(57) ABSTRACT

A display system includes a portable display device; a distance detection section that detects a distance between a work object and the portable display device; and a display control section that displays object-related information, which indicates content relevant to the work object, on the portable display device. The display control section changes an object-related information display mode in the portable display device according to a result which is acquired in such a way that the distance detection section detects the distance.

10 Claims, 9 Drawing Sheets

(56) References Cited

U.S. PATENT DOCUMENTS

2015/0138595 A1* 5/2015 Sugimoto ............ H04N 1/0044
                                                                     358/1.15

FOREIGN PATENT DOCUMENTS

| JP | 2011-227644 A | 11/2011 |
| --- | --- | --- |
| JP | 2011-227649 A | 11/2011 |
| JP | 2013-077328 A | 4/2013 |
| JP | 2013-242865 A | 12/2013 |
| JP | 2014-164374 A | 9/2014 |
| JP | 2014-186434 A | 10/2014 |
| JP | 2014-219468 A | 11/2014 |
| JP | 2014-225823 A | 12/2014 |

* cited by examiner

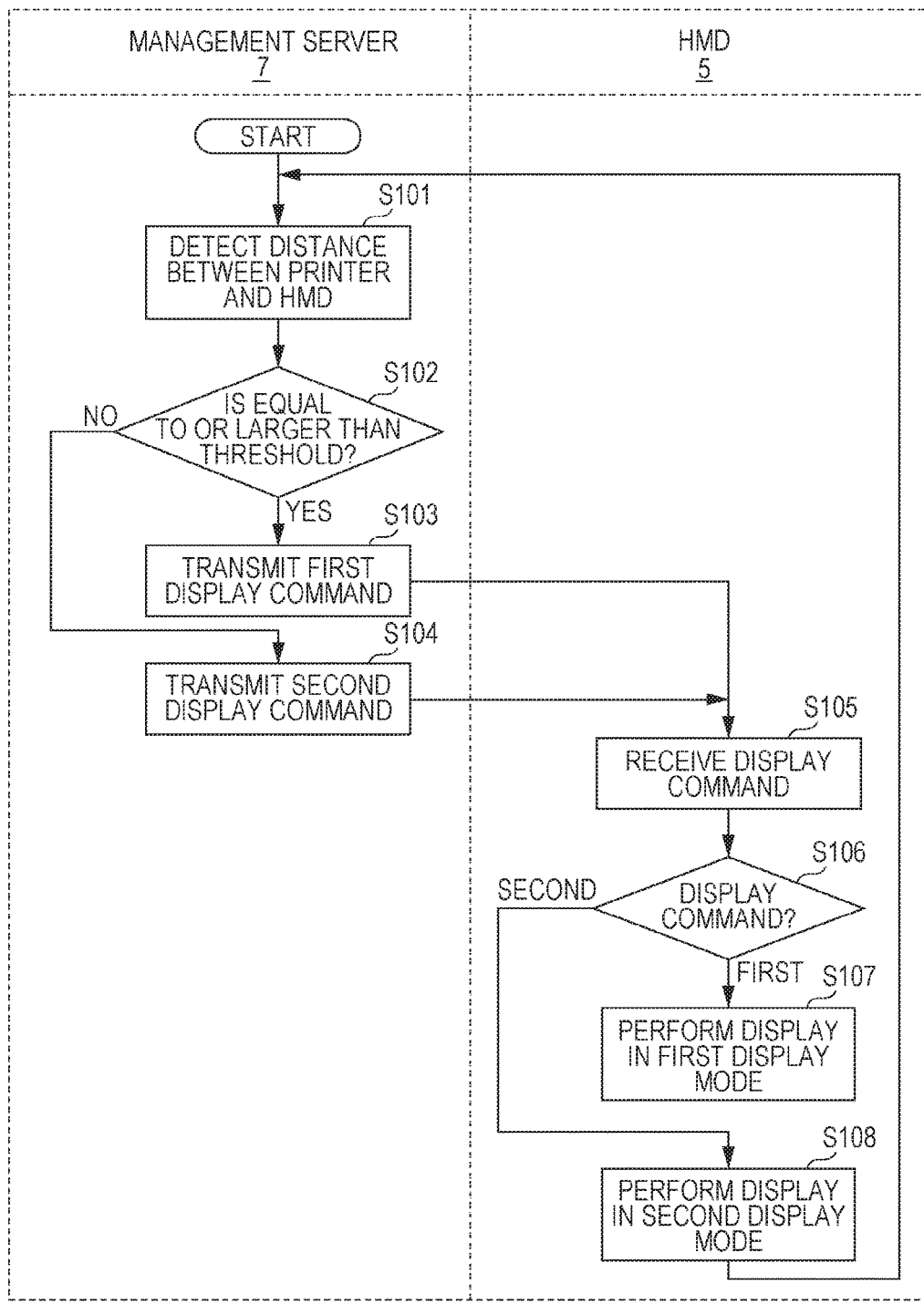

FIRST DISPLAY MODE

SECOND DISPLAY MODE

FIRST DISPLAY MODE

SECOND DISPLAY MODE

FIRST DISPLAY MODE

SECOND DISPLAY MODE

THIRD DISPLAY MODE

DISPLAY SYSTEM, PORTABLE DISPLAY DEVICE, DISPLAY CONTROL DEVICE, AND DISPLAY METHOD

BACKGROUND

1. Technical Field

The present invention relates to a technology which displays information, which indicates content relevant to a work object, on a portable display device such as a Head Mounted Display (HMD), a smart phone, a tablet or a laptop computer.

2. Related Art

JP-A-2014-186434 discloses a display system which acquires locational information of an HMD using a Global Positioning System (GPS), and displays the content of a tag associated with the location of the HMD on the HMD. According to the display system, the content of a tag associated with the location of a user who wears the HMD is displayed on the HMD. Accordingly, in environment in which tags are associated with various locations in the real world, the tags, which are targets to display content to the HMD mounted on the user, sequentially change if the user moves.

Meanwhile, it can be expected that it is possible to suitably apply a display technology, which uses a portable display device such as the HMD, for a purpose of supporting a worker who performs work on a work object by displaying information which indicates content relevant to a work object. However, the technology disclosed in JP-A-2014-186434 only switches content which is displayed according to a location on the real world, and is not appropriate to display information, which indicates content relevant to a work object, to the worker who performs work on the work object.

SUMMARY

An advantage of some aspects of the invention is to provide a technology which enables information, which indicates content relevant to a work object, to be displayed in a suitable mode.

According to an aspect of the invention, there is provided a display system including: a portable display device; a distance detection section that detects a distance between a work object and the portable display device; and a display control section that displays object-related information, which indicates content relevant to the work object, on the portable display device, and the display control section changes an object-related information display mode in the portable display device according to a result which is acquired in such a way that the distance detection section detects the distance.

According to another aspect of the invention, there is provided a portable display device including: a distance detection section that detects a distance from a work object; a display section; and a display control section that displays object-related information, which indicates content relevant to the work object, on the display section, and the display control section changes an object-related information display mode in the display section according to a result which is acquired in such a way that the distance detection section detects the distance.

According to still another aspect of the invention, there is provided a display control device including: a distance detection section that detects a distance from a work object; and a display control section that displays object-related information, which indicates content relevant to the work object, on a portable display device, the display control section changes an object-related information display mode in the portable display device according to a result which is acquired in such a way that the distance detection section detects the distance.

According to still another aspect of the invention, there is provided a display method including: detecting a distance between a work object and a portable display device; and displaying object-related information, which indicates content relevant to the work object, on the portable display device, and an object-related information display mode in the portable display device is changed according to a result acquired by detecting the distance between the work object and the portable display device.

In the invention (the display system, the portable display device, and the display method) which is configured as described above, the object-related information, which indicates content relevant to the work object, is displayed on the portable display device. Accordingly, a worker can perform work on the work object while checking the object-related information which is displayed on the portable display device. However, in the invention, the object-related information display mode in the portable display device changes according to a result acquired by detecting the distance between the work object and the portable display device. In this manner, it is possible to display the information, which indicates the content relevant to the work object, in a suitable mode according to the distance between the work object and the portable display device.

Specifically, the display system may be configured such that the display control section changes a shape of a display area, in which the object-related information is displayed, according to the distance which is detected by the distance detection section. In this manner, it is possible to display the information, which indicates the content relevant to the work object, in a suitable shape according to the distance between the work object and the portable display device.

In addition, the display system may be configured such that the display control section changes the display mode according to a size relation between the distance, which is detected by the distance detection section, and a threshold. In the display system, before and after the size relation between the distance, which is detected by the distance detection section, and the threshold is reversed, the object-related information display mode switches. Therefore, it is possible to suppress the change in the object-related information display mode from disturbing the visual field of the worker, compared to a case in which the object-related information display mode is continuously changed according to, for example, the change in the distance which is detected by the distance detection section.

In addition, the display system may be configured such that, when the distance which is detected by the distance detection section changes in order of a first distance, a second distance which is shorter than the first distance, and a third distance which is longer than the second distance, the display control section causes the display mode in which the object-related information is displayed according to the detection of the first distance and the display mode in which the object-related information is displayed according to the detection of the third distance to be different from each other. In the display system, when the portable display device goes away from the work object after the portable display device approaches the work object, the object-related information display mode differs before the portable display device goes away from the work object and after the portable display device approaches the work object. That is, it is possible to display the information, which indicates the content relevant to the work object, in a mode according to history of the change in the distance between the work object and the portable display device.

At this time, the display control section may cause the display mode in which the object-related information is displayed according to the detection of the first distance, the display mode in which the object-related information is displayed according to the detection of the first distance, and the display mode in which the object-related information is displayed according to the detection of the third distance to be different from each other.

In addition, the display system may be configured such that the display control section can handle a plurality of work objects, displays the object-related information for a work object which is selected from among the plurality of work objects, and does not display the object-related information for the work objects which are not selected. In the display system, it is possible to narrow down the work objects which display the object-related information, from among the plurality of work objects, and it is possible to suppress the display of the object-related information from disturbing the visual field of the worker.

Meanwhile, various configurations are assumed as detailed configurations of the portable display device. Here, the portable display device may be configured such that the portable display device further includes an imaging section that images a work object, and the display control section displays the object-related information to superimpose on an imaging result of the imaging section.

BRIEF DESCRIPTION OF THE DRAWINGS

The invention will be described with reference to the accompanying drawings, wherein like numbers reference like elements.

FIG. 6 is a flowchart illustrating an example of an operation which is performed to support workers.

DESCRIPTION OF EXEMPLARY EMBODIMENTS

Figure 1:
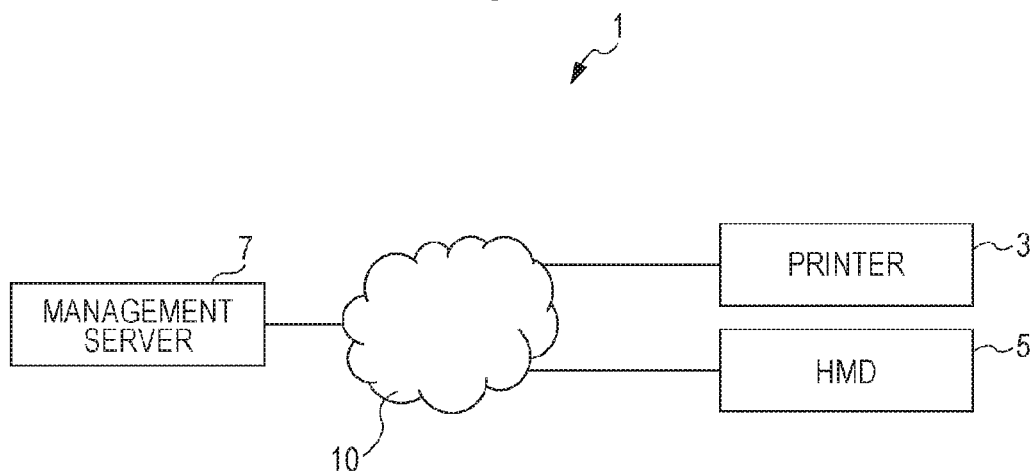
FIG. 1 is a block diagram schematically illustrating an example of a display system according to the invention.

FIG. 1 is a block diagram schematically illustrating an example of a display system according to the invention. A display system 1 includes a printer 3 which is a work object of workers, HMDs 5 which display work contents, and a management server 7 which manages the printer 3 and the HMDs 5.

The printer 3, the HMD 5, and the management server 7 are respectively connected to the Internet 10, and the management server 7 performs communication between the printer 3 and the HMD 5 through the Internet 10. Meanwhile, the Internet 10 is shown as an example of a communication line, and a detailed configuration, which realizes the communication between the printer 3, each of the HMDs 5, and the management server 7, is not limited to the Internet 10. In addition, when the printer 3 includes a function which is necessary for the management server 7 to perform, communication may be performed without passing through the management server 7.

The display system 1 is suitable for supporting workers who execute the work for the printer 3. That is, when an event, such as a paper jam or low ink, occurs in the printer 3, the management server 7 displays the occurrence of the event on the HMD 5 which is mounted on the worker. The management server 7 can appropriately display work contents which should be performed for the event by the workers on the HMDs 5.

Figure 2:
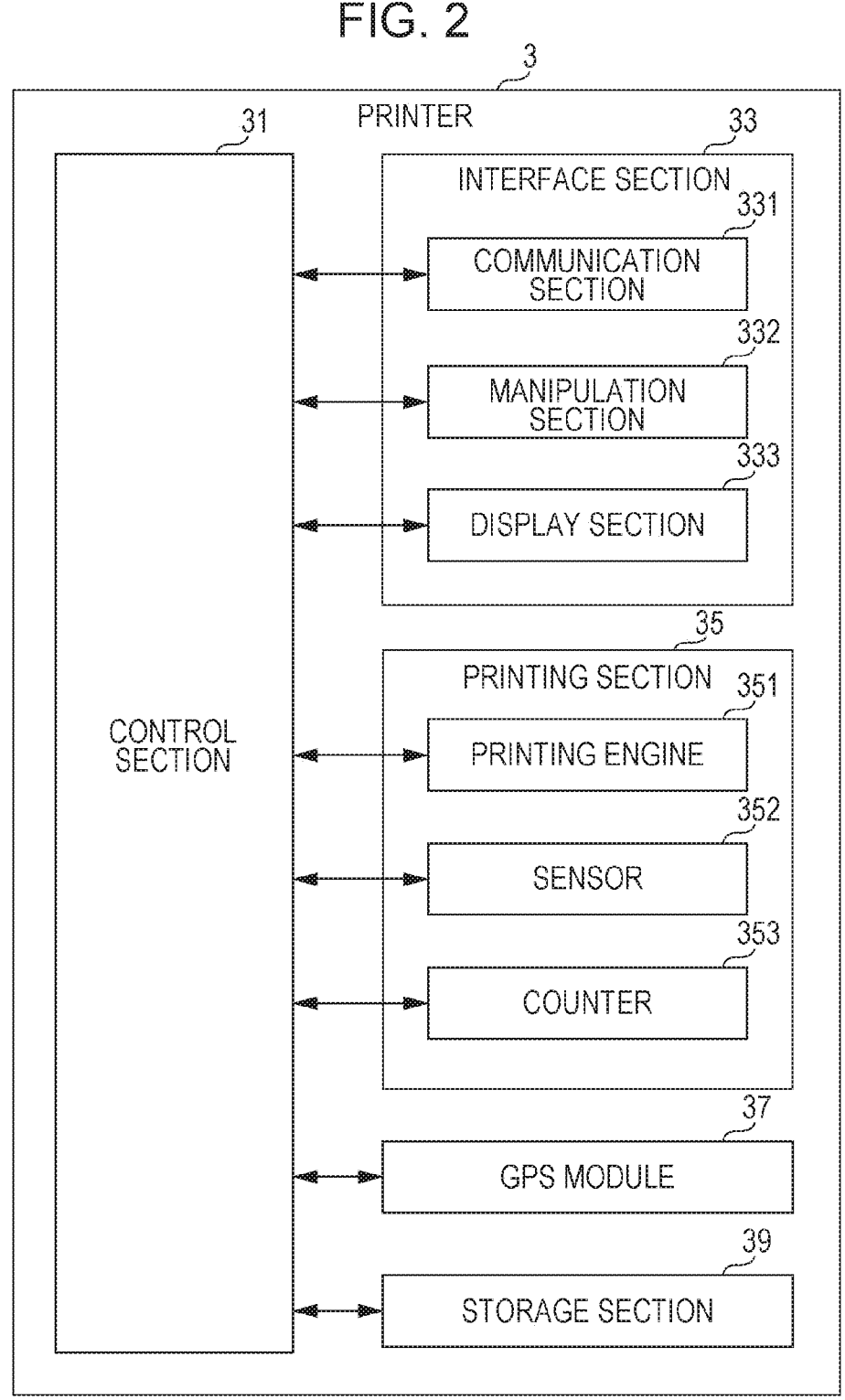
FIG. 2 is a block diagram illustrating an example of the configuration of a printer.

FIG. 2 is a block diagram illustrating an example of the configuration of the printer. The printer 3 includes a control section 31, an interface section 33, a printing section 35, a GPS module 37, and a storage section 39. The control section 31 is a computer which includes a Central Processing Unit (CPU) and a Random Access Memory (RAM), and integrally controls operations which are executed in the printer 3. Accordingly, the interface section 33, the printing section 35, the GPS module 37, and the storage section 39 are operated under the control of the control section 31.

The interface section 33 performs an interface function between the printer 3 and an external device or the workers. A communication section 331 is connected to the Internet 10, and performs communication with the management server 7 through the Internet 10. In addition, a manipulation section 332 includes buttons which receive input manipulation, and a display section 333 includes a display or the like which displays various information relevant to the printer 3. Meanwhile, the manipulation section 332 and the display section 333 may be integrally formed using, for example, a touch panel.

The printing section 35 includes a printing engine 351, a sensor 352 and a counter 353. The printing engine 351 has a mechanical configuration in which an image is printed on a printing medium. The printing engine 351 prints an image on a printing medium by discharging ink from an ink jet type discharge head to a winding-type printing medium (web) which is transported roll to roll. Meanwhile, the detailed configuration of the printing engine 351 is not limited the example described here. The printing engine 351 may perform printing on a sheet-type printing medium or may perform printing using a toner in a laser printing manner. Further, the sensor 352 detects the state of the printing engine 351, and the counter 353 counts various numerical values which change in accordance with the operation of the printing engine 351.

The state of the printing engine 351 includes, for example, a printing medium transport state, the opening and closing state of the cover of a main body, the attachment state of various components, and the like. The sensor 352 is provided to detect the states. In addition, the numerical values, which change in accordance with the operation of the printing engine 351, include, for example, the integrated length of a printed printing medium, ink consumption (or the amount of remaining ink), the integrated rotation amount of rotating mechanical components (for example, a roller which transports the printing medium), and the like. Various types of counters 353 are provided to count the numerical values.

The GPS module 37 detects the installation location of the printer 3 using a satellite location system. In addition, the storage section 39 includes a storage medium, such as a Read Only Memory (ROM), a Hard Disk Drive (HDD) or RAM, and stores various programs or data which are used in the printer 3.

Figure 3:
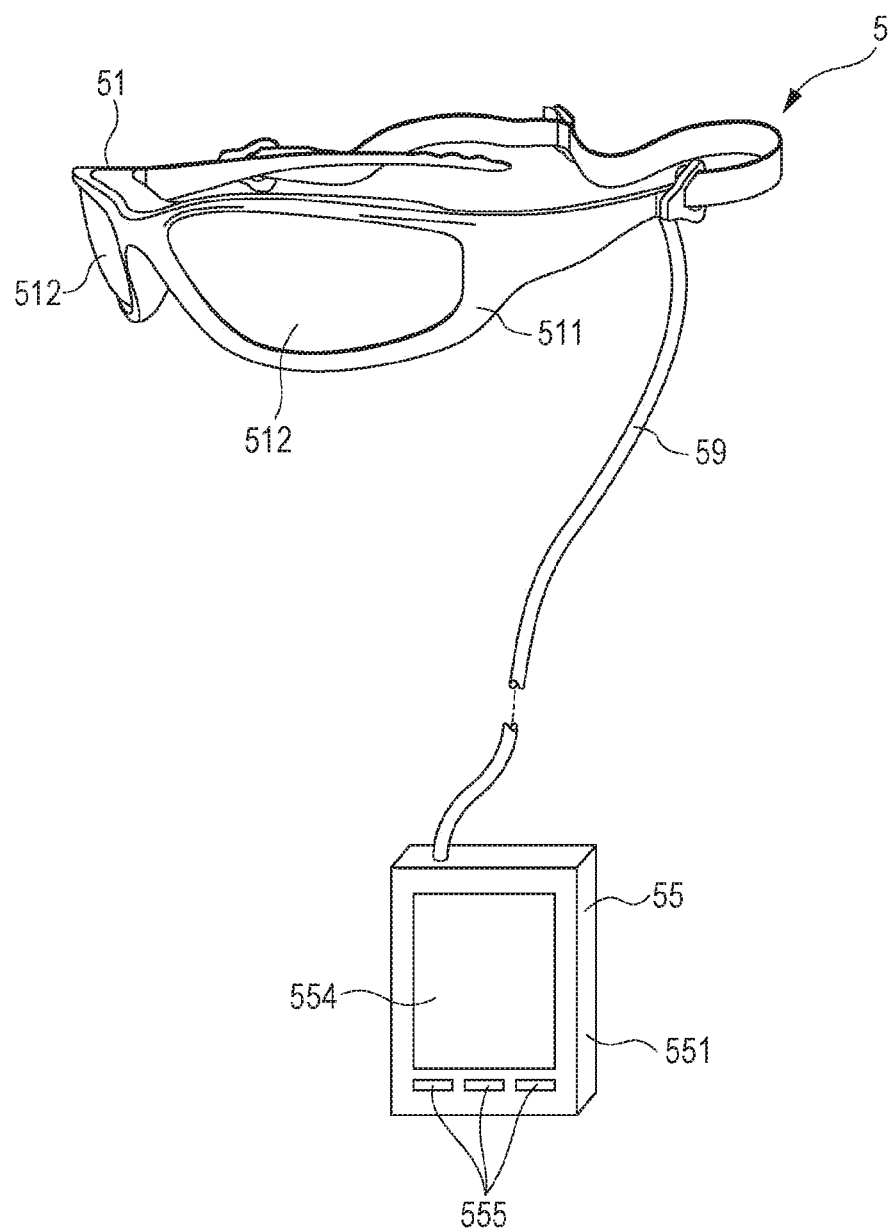
FIG. 3 is a diagram schematically illustrating an example of the mechanical configuration of an HMD.
Figure 4:
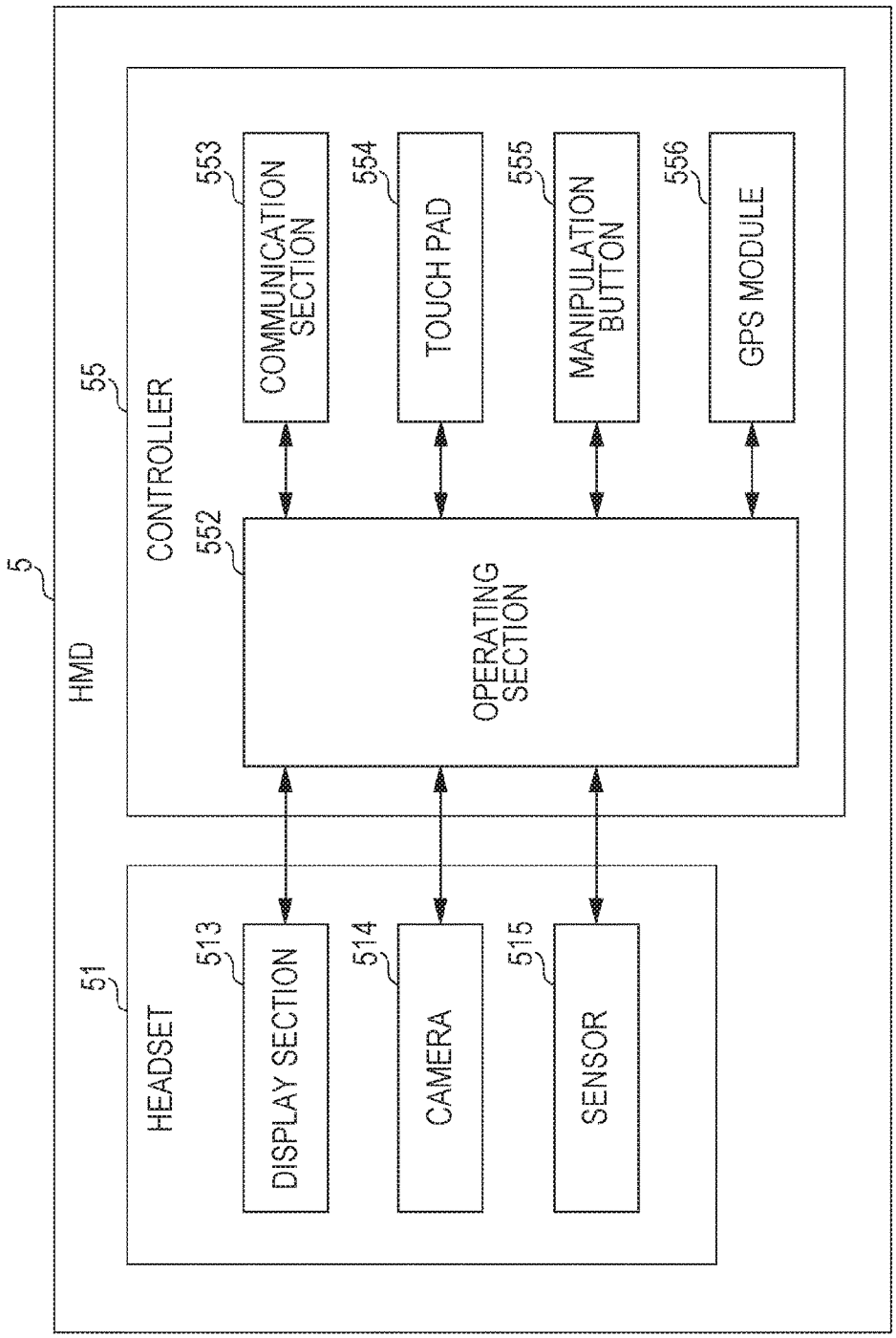
FIG. 4 is a block diagram illustrating an example of an electrical configuration included in the HMD of FIG. 3.

FIG. 3 is a diagram schematically illustrating an example of the mechanical configuration of an HMD. FIG. 4 is a block diagram illustrating an example of an electrical configuration included in the HMD of FIG. 3. The HMD 5 includes a headset 51 which is mounted on a worker, a portable controller 55, and a cable 59 which connects the headset 51 to the controller 55. The HMD 5 is, for example, a light transmission type HMD which includes the same configurations as a virtual image display device disclosed in JP-A-2014-219468 and JP-A-2014-225823.

The headset 51 includes a glass type frame 511, which can be mounted on the head of the worker, and lenses 512 which are attached to the frame 511. The respective lenses 512 are located in front of the left and right eyes of the worker who wears the frame 511, and transmit visible light. Accordingly, the worker who wears the headset 51 can visually recognize a peripheral situation through the respective lenses 512. Further, a display section 513, which displays an image to the worker, is embedded in the frame 511. Accordingly, the worker who wears the headset 51 can visually recognize an image which is displayed by the display section 513. In other words, the headset 51 can display an image, which is generated by the display section 513, to superimpose the peripheral situation through the lenses 512. Meanwhile, the display section 513 may be a type in which a virtual image is displayed or a type in which the virtual image is formed on the retinas of the worker. In addition, a camera 514, which images the peripheral situation, and a sensor 515, which detects the bearing of the headset 51, are attached to the frame 511.

The controller 55 has a configuration in which an operating section 552, a communication section 553, a touch pad 554, manipulation buttons 555, and a GPS module 556 are attached to a portable housing 551 which can be carried in such a way that the worker puts the controller into the pocket of cloth or can be carried in hand. The operating section 552 is a computer which includes a CPU and a RAM, and integrally performs operation processes in the HMD 5. The communication section 553 is connected to the Internet 10, and performs communication with the management server 7 through the Internet 10. The touch pad 554 and the manipulation buttons 555 function as user interfaces, respectively. That is, when the worker performs input manipulation on the touch pad 554 or the manipulation buttons 555, the operating section 552 controls the display section 513 according to the input manipulation. In this manner, it is possible to perform display control such as the change in the location or content of an image to be displayed to the worker according to the manipulation which is input by the worker. The GPS module 556 detects the location of the HMD 5 using the satellite location system. Meanwhile, a method of detecting the location is not limited thereto, and it is possible to use various methods using ultrasonic waves, the wireless, and the like.

Figure 5:
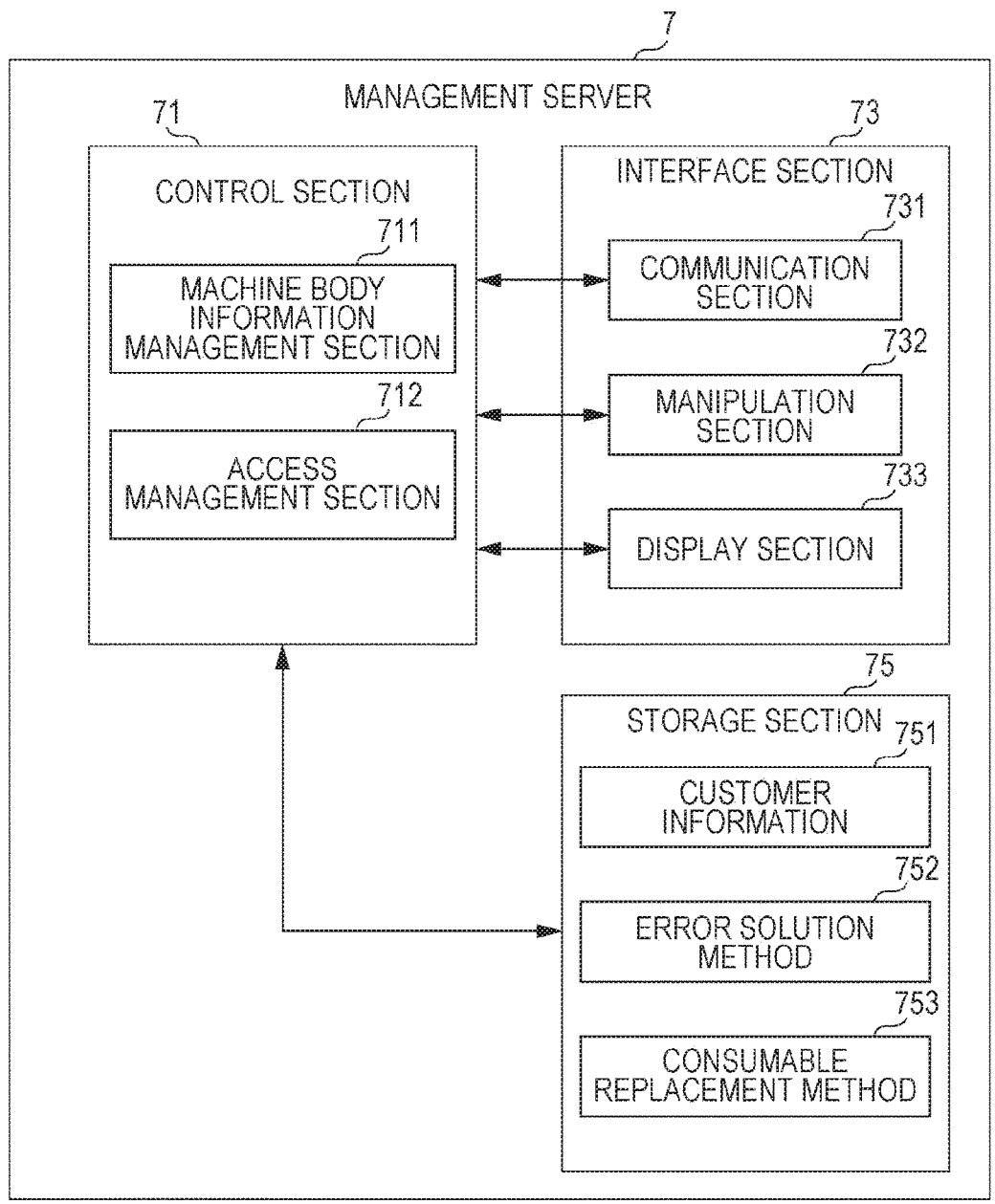
FIG. 5 is a block diagram illustrating an example of the configuration of a management server.

FIG. 5 is a block diagram illustrating an example of the configuration of the management server. The management server 7 includes a control section 71, an interface section 73, and a storage section 75. The control section 71 is a computer which includes a CPU and a RAM, and integrally controls operations which are performed in the management server 7. Accordingly, the interface section 73 and the storage section 75 are operated under the control of the control section 71. In addition, when the control section 71 executes a predetermined HMD control program, a machine body information management section 711 and an access management section 712 are constructed inside.

The machine body information management section 711 manages information relevant to the printer 3 (machine body) which is a work object for a worker. That is, the machine body information management section 711 acquires status information, which indicates the state of the printing engine 351 of the printer 3, by receiving a detection result acquired by the sensor 352 from the printer 3, acquires consumption information, which indicates the states of consumables (the amount of residual ink, the residual lifetimes of the components of a rotary machine, and the like), by receiving the counted result of the counter 353 from the printer 3, or acquires locational information, which indicates the location of the printer 3, by receiving the detection result acquired by the GPS module 37 from the printer 3.

The access management section 712 manages authority for the HMD 5 to access the management server 7 and manages the display of work contents to the HMD 5 to which the access authority is applied. That is, when the worker inputs Identification Data (ID) and a password by manipulating a manipulation section 732 of the HMD 5, the access management section 712 receives the input content of the worker from the HMD 5. Further, when the input content is suitable, the access management section 712 applies access authority to the HMD 5, and selects the HMD 5 as the display target for the work content to be executed by the printer 3.

In addition, the access management section 712 acquires the locational information of the HMD 5 when the HMD 5 receives the detection result of the GPS module 556 for the HMD 5. Further, as will be described later, the access management section 712 calculates the distance between the printer 3 and the HMD 5 based on the locational information of the printer 3 and the locational information of the HMD 5 which are acquired by the machine body information management section 711, and controls the display content of the HMD 5 based on the result of the calculation.

The interface section 73 performs an interface function between the management server 7 and an external device or a worker. A communication section 731 is connected to the Internet 10, and performs communication with each of the printer 3 and the HMD 5 through the Internet 10. In addition, the manipulation section 732 includes a keyboard and a mouse which receive input manipulation from the worker, and a display section 733 includes a display or the like which displays various information to the worker. Meanwhile, the manipulation section 732 and the display section 733 may be integrally formed by, for example, a touch panel.

The storage section 75 includes a storage medium, such as a ROM, HDD or a RAM, and stores various programs (including the HMD control program) and data which are used in the management server 7. Specifically, the storage section 75 stores customer information 751, which indicates information related to a customer who uses the printer 3, an error solution method 752 indicative of a method for solving errors which has occurred in the printer 3, and a consumable exchanging method 753 indicative of a method for exchanging the consumables (ink, components of rotary machine, and the like) of the printer 3, as data.

FIG. 6 is a flowchart illustrating an example of an operation which is executed in the display system in order to support workers who divide work for the printer. In the drawing, in order to show the execution subject in each step of the flowchart, columns for the management server 7 and the HMD 5 are provided and steps are shown in the respective columns of the execution subjects. Specifically, the flowchart of the drawing is executed when an event, such as paper jam or low ink, occurs in the printer 3. Specifically, when the management server 7 detects the occurrence of an event based on the output values of the sensor 352 and the counter 353 of the printer 3, the flowchart of the drawing is executed.

As shown in the drawing, the access management section 712 of the management server 7 detects the distance between the printer 3 and the HMD 5 based on the respective pieces of locational information of the printer 3 and the HMD 5 (step S101). Further, the access management section 712 determines whether or not the detected distance acquired in step S101 is equal to or larger than a predetermined threshold (step S102). When the detected distance is equal to or larger than the threshold ("YES" in step S102), a first display command, which causes the event-related information that is related to the event which has occurred in the printer 3 to be displayed in a first display mode, is issued in the access management section 712 and is transmitted to the HMD 5 (step S103). In contrast, when the detected distance is smaller than the threshold ("NO" in step S102), a second display command, which causes the event-related information to be displayed in a second display mode that is different from the first display mode, is issued in the access management section 712 and is transmitted to the HMD 5 (step S104). Meanwhile, the detailed examples of the first display mode and the second display mode will be described with reference to the drawings. In addition, the invention is not limited to the detection of the distance based on the respective pieces of locational information of the printer 3 and the HMD 5. The distance between the printer 3 and the HMD 5 may be detected by a sensor or the like.

When the first or second display command is received from the HMD 5 (step S106), the HMD 5 displays event-related information in a display mode according to a received result. That is, it is determined whether the received result is the first display command or the second display command (step S106). When the received result is the first display command (in a case of "first" in step S106), the event-related information is displayed in the first display mode (step S107). When the received result is the second display command (in a case of "second" in step S106), the event-related information is displayed in the second display mode (step S108).

As described above, according to whether or not the distance between the printer 3 and the HMD 5 is equal to or larger than the threshold, the display mode of the event-related information in the HMD 5 is switched between the first display mode and the second display mode. That is, when the distance between the HMD 5, which are mounted on the worker, and the printer 3 is equal to or larger than the threshold, the HMD 5 displays the event-related information in the first display mode. In contrast, when the distance between the HMD 5, which are mounted on the worker, and the printer 3 is smaller than the threshold, HMD 5 displays the event-related information in the second display mode. Accordingly, when the worker who wears the HMD 5 approaches the printer 3 or is separated from the printer 3, it is possible to switch the display mode of the event-related information in the HMD 5 between the first display mode and the second display mode.

Figure 7A:
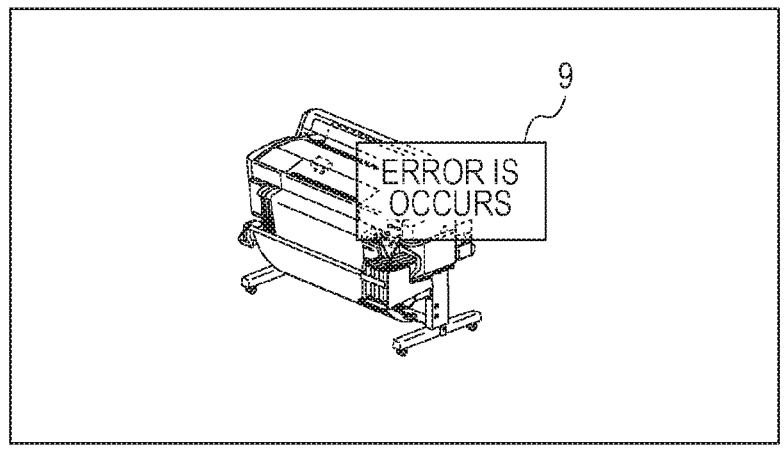
FIGS. 7A and 7B are diagrams schematically illustrating a first example of the display mode of event-related information in the HMD.
Figure 7B:
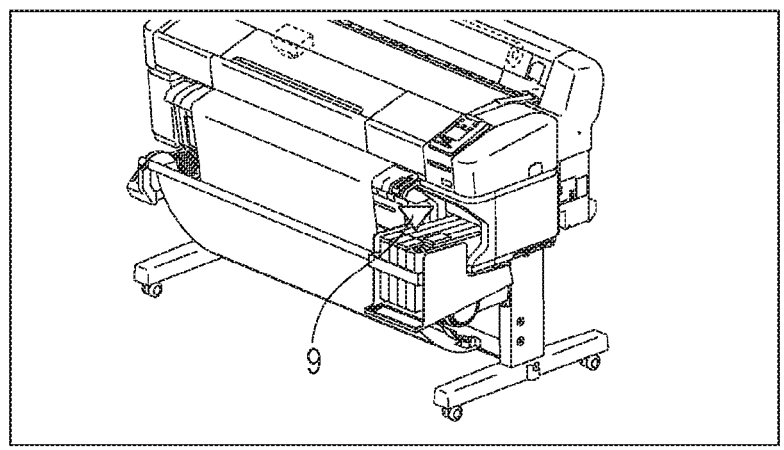

FIGS. 7A and 7B are diagrams schematically illustrating a first example of the display mode of the event-related information in the HMD. In the example of FIGS. 7A and 7B, the event-related information for the printer 3 is shown by an indicator 9 in such a way that the indicator 9 (a balloon, a mark, text or the like), which is displayed by the display section 513, is appropriately superimposed on the printer 3 which is visually recognized by the worker through the lenses 512.

When the worker is separated from the printer 3 and the HMD 5, which is mounted on the worker, is separated from the printer 3 at a distance which is equal to or larger than the threshold, the indicator 9, which is configured such that the content of the event (error occurrence) is described in a balloon by text, is displayed by the display section 513 (first display mode). Accordingly, even when the worker is separated from the printer 3, the worker can grasp that an error occurs in the printer 3.

In contrast, when the worker who grasps the error occurrence approaches the printer 3 in order to perform work corresponding to the error and the distance between the HMD 5 which is mounted on the worker, and the printer 3 is less than the threshold, the indicator 9 which includes a triangular mark indicative of an error occurring location is displayed by the display section 513 (second display mode). In the second display mode, the content of the event which has occurred in the printer 3 is not displayed by text unlike the first display mode. That is, the content of the event is already known to the worker who recognizes the first display mode, and thus there is lesser meaning for displaying the content of the event and the event occurring location is important for the worker who approaches the printer 3 in order to perform work corresponding to the event. Here, it is rational that the indicator 9 which indicates the event occurring location using the maker without displaying the content of the event using text.

Figure 8A:
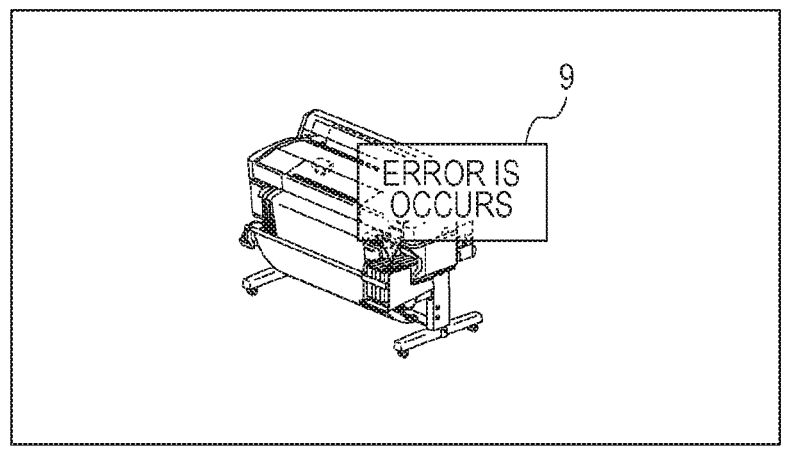
FIGS. 8A and 8B are diagrams schematically illustrating a second example of the display mode of the event-related information in the HMD.
Figure 8B:
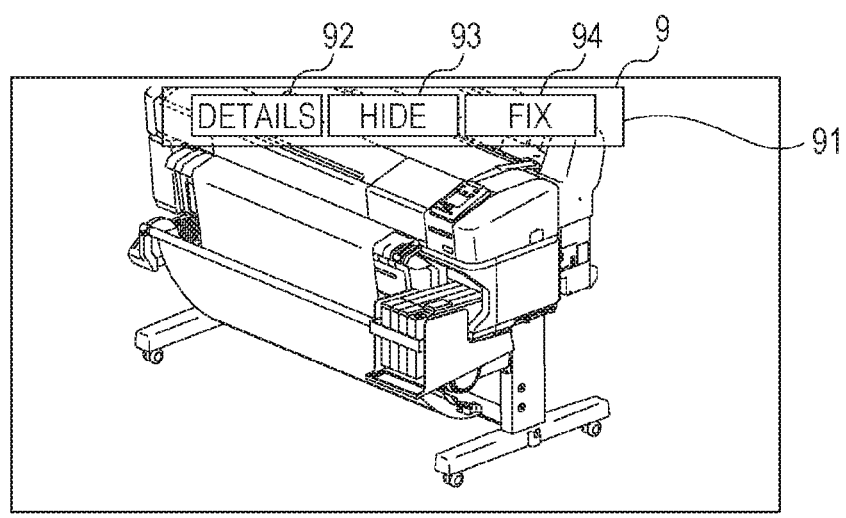

FIGS. 8A and 8B are diagrams schematically illustrating a second example of the display mode of the event-related information in the HMD. In the example in FIGS. 8A and 8B, the event-related information for the printer 3 is shown by the indicator 9 in such a way that the indicator 9, which is displayed by the display section 513, is appropriately superimposed on the printer 3 which is visually recognized by the worker through the lenses 512. The first display mode in a case in which the HMD 5 which is mounted on the worker is separated from the printer 3 by a distance which is equal to or larger than the threshold, is the same as in the first example of FIGS. 7A and 7B.

In contrast, when the distance between the HMD 5, which is mounted on the worker, and the printer 3 is less than the threshold, the indicator 9 which includes various icons 92, 93, and 94 arranged inside of a horizontally long rectangular menu bar 91 is displayed by the display section 513 (second display mode). The indicator 9 is displayed in a location other than the location that the worker performs work corresponding to the event. Therefore, it is possible to suppress the indicator 9 from disturbing the visual field of the worker who performs work corresponding to the event.

Further, the worker can select and execute one of the icons 92, 93, and 94. At this time, various detailed configurations are taken into consideration in order to realize the selection of the icons. For example, a configuration may be provided in which the operating section 552 determines a selected icon based on the input to the touch pad 554 or the manipulation buttons 555 under the control of the controller 55. Otherwise, a configuration may be provided in which the operating section 552 determines the selected icon based on a result acquired by determining a location indicated by a finger of the worker from an image imaged by the camera 514.

When the icon 92 which indicates "details" is selected, the display section 513 displays an error occurring location or the detailed content of the error (for example, low ink or the like). When the icon 93 which indicates "hide" is selected, the display section 513 stops display in the second display mode, and returns to the display in the first display mode. Otherwise, when the icon 94 which indicates "fix" is selected, the display section 513 fixes the display of the indicator 9 in the second display mode regardless of the distance between the printer 3 and the HMD 5.

As described above, in the embodiment, the event-related information that is related to the event which has occurred in the printer 3 is displayed on the HMD 5 using the indicator 9. Accordingly, the worker can perform work for the printer 3 while recognizing the event-related information which is displayed on the HMD 5. However, in the embodiment, the display mode of the event-related information in the HMD 5 is changed according to a result of detection of the distance between the printer 3 and the HMD 5. In this manner, it is possible to display the information, which indicates the content relevant to the printer 3, in a suitable mode according to the distance between the printer 3 and the HMD 5.

Specifically, the shape of the display area, in which the event-related information is displayed (that is, the shape of the indicator 9), is changed according to the detected distance between the printer 3 and the HMD 5. In this manner, it is possible to display the event-related information in a suitable shape according to the distance between the printer 3 and the HMD 5.

In addition, the display mode of the event-related information is changed according to the size relation of the detected distance between the printer 3 and the HMD 5 and the threshold. In the configuration, before and after the size relation between the detected distance and the threshold is reversed, the display mode of the event-related information is switched. Therefore, it is possible to suppress the change in the display mode of the event-related information from disturbing the visual field of the worker, compared to, for example, a case in which the display mode of the event-related information is continuously changed according to the change in the detected distance.

As described above, in the embodiment, the display system 1 corresponds to an example of "the display system" according to the invention, the HMD 5 corresponds to an example of "the portable display device" according to the invention, the management server 7 corresponds to an example of "the display control device" according to the invention, the printer 3 corresponds to an example of "the work object" according to the invention, and the control section 71 functions as an example of "the distance detection section and the display control section which are included in the display system or the display control" according to the invention. In addition, the event-related information or the information which is indicated by the indicator 9 corresponds to "the object-related information" according to the invention.

Meanwhile, the invention is not limited to the above-described embodiment, and various modifications can be added to the embodiment without departing from the gist of the invention. Accordingly, for example, the execution subject in each step of the flowchart illustrated in FIG. 6 may be appropriately modified. Specifically, the HMD 5 may execute the detection of the distance between the printer 3 and the HMD 5.

In a modification example, the operating section 552 of the HMD 5 acquires the locational information of the printer 3, which is acquired by the machine body information management section 711, from the management server 7. Further, the operating section 552 detects the distance between the printer 3 and the HMD 5 based on the locational information of the printer 3, which is acquired from the management server 7, and the locational information of the HMD 5 which is acquired by the GPS module 556. Further, the operating section 552 similarly functions as the access management section 712 according to the embodiment, and switches the display mode by the display section 513 according to the detected distance. In the configuration, the HMD 5 corresponds to an example of "the portable display device" according to the invention, and the operating section 552 functions as an example of the distance detection section and the display control section which are included in "the portable display device" according to the invention.

Figure 9A:
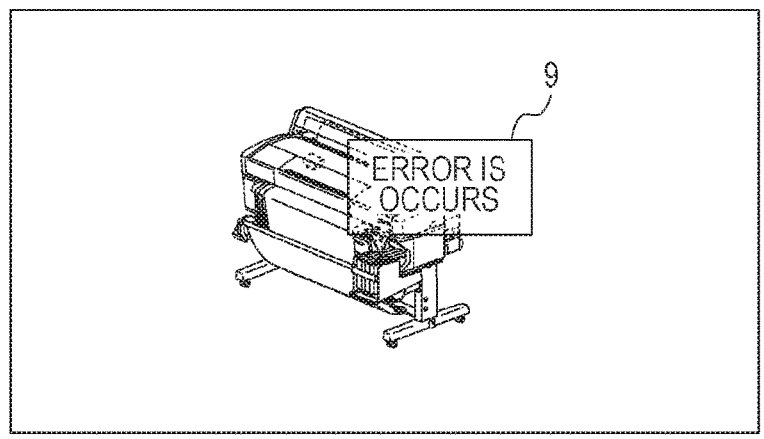
FIGS. 9A to 9C are diagrams schematically illustrating a third example of the display mode of the event-related information in the HMD.
Figure 9B:
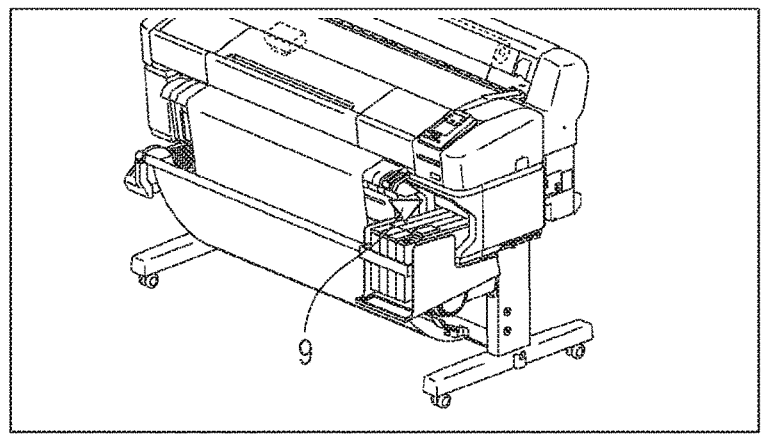
Figure 9C:
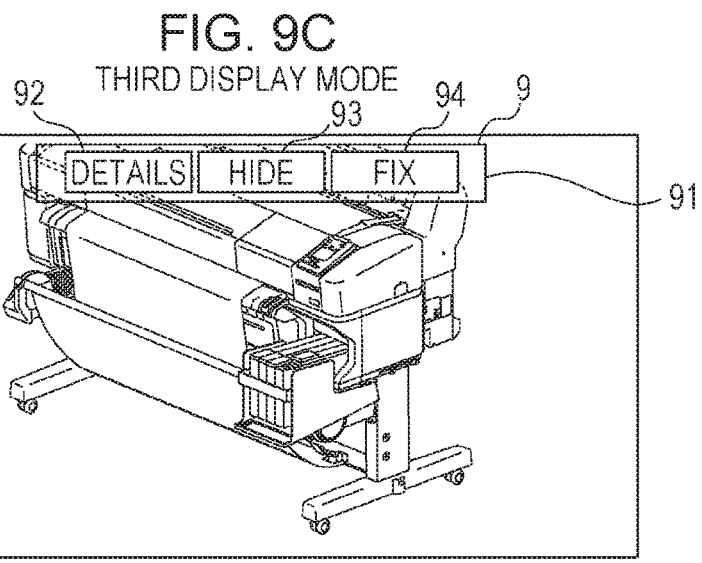

In addition, the display mode of the indicator 9 may be switched according to the history of the change in the detected distance instead of the size relation between the detected distance and the threshold, as shown in FIGS. 9A to 9C. FIGS. 9A to 9C are diagrams schematically illustrating a third example of the display mode of the event-related information in the HMD. In the example of FIGS. 9A to 9C, the event-related information for the printer 3 is shown by the indicator 9 in such a way that the indicator 9, which is displayed by the display section 513, is appropriately superimposed on the printer 3 which is visually recognized by the worker through the lenses 512.

The first display mode in a case in which the worker is separated from the printer 3 and the second display mode in a case in which the worker who grasps the error occurrence in the first display mode approaches the printer 3 are the same as in the first example of FIGS. 7A and 7B. However, in the third example of FIGS. 9A to 9C, when the worker is separated from the printer 3 after the worker approaches the printer 3 and the detected distance is equal to or larger than the threshold again, display is performed in a third display mode which is different from the first and second display modes. Meanwhile, since the third display mode in the third example of FIGS. 9A to 9C is the same as the second display mode in the second example of FIGS. 8A and 8B, the description of the details thereof will not be repeated.

That is, when an error occurs in the printer 3 and the result, which is acquired by detecting the distance between the printer 3 and the HMD 5, is a distance which is equal to or larger than the threshold (first distance), the access management section 712 displays the indicator 9 in the first display mode. Accordingly, when the worker recognizes the indicator 9, it is possible to grasp that the error has occurred in the printer 3. In contrast, when the worker who grasps that the error has occurred approaches the printer 3 in order to perform work corresponding to the error and the result acquired by detecting the distance between the HMD 5, which is mounted on the worker, and the printer 3 is a distance (second distance) which is shorter than the threshold, the access management section 712 displays the indicator 9 in the second display mode. Accordingly, when the worker recognizes the indicator 9, it is possible to grasp the error occurring location in the printer 3. Further, when the worker is separated from the printer 3 and the result acquired by detecting the distance between the HMD 5, which is mounted on the worker, and the printer 3 is a distance (third distance) which is equal to or larger than the threshold, the access management section 712 displays the indicator 9 in the third display mode.

In the third example of FIGS. 9A and 9B, the display mode of the event-related information in the HMD 5 is changed according to the result acquired by detecting the distance between the printer 3 and the HMD 5. In this manner, it is possible to display the information, which indicates the content relevant to the printer 3, in a suitable mode according to the distance between the printer 3 and the HMD 5.

In addition, in the third example of FIGS. 9A to 9C, when the HMD 5 is separated from the printer 3 after approaching the printer 3, the display mode of the printer 3 differs before approaching the printer 3 and after being separated from the printer 3. That is, it is possible to display the information, which indicates the content relevant to the printer 3, in a mode according to history of the change in the distance between the printer 3 and the HMD 5.

Meanwhile, in above, a case in which there is one printer 3 as the work object is described as an example. However, the number of printers 3 is not limited to one and a plurality of printers may be provided. In this case, pieces of event-related information for the plurality of respective printers 3 may be displayed on the HMD 5. However, if there are a plurality of pieces of event-related information to be displayed, it is assumed that the display of the HMD 5 is complicated. Here, priorities may be provided to the plurality of respective printers 3, and the event-related information for a printer 3 which is at a high priority may be selectively displayed on the HMD 5.

That is, for example, the worker may selectively display the event-related information for the printer 3 which is captured in the visual field. In the configuration, the locational relationship between each of the printers 3 and the HMD 5 is grasped based on the locational information of each of the control section 71 of the management server 7, the printer 3, and the HMD 5. Further, the control section 71 detects the bearing of the headset 51 from the sensor 515 of the HMD 5, and specifies the printers 3 which enter the visual fields of the workers who wear respective HMDs 5. Further, when a printer 3 enters the visual field, the control section 71 displays the event-related information of the specified printer 3 to the HMD 5 which is mounted on the worker, and does not display the pieces of event-related information of the other printers 3. In this manner, when the worker faces in a direction of the printer 3, of which it is desired to grasp the event-related information, it is possible to easily grasp the event-related information.

Otherwise, when respective printers 3 are closely arranged and a plurality of printers 3 exist in the visual field of the worker who wears the HMD 5, the printer 3, which displays the event-related information, may be selected by manipulating the menu bar 91. In the configuration, icons for selecting the printer 3, which displays the event-related information, for example, an icon which indicates "next" and an icon which indicates "return" are provided in the menu bar 91. Further, in an initial state, the event-related information is provided for one of the plurality of printers 3 which enter the visual field, for example, a printer 3 which is the closest to the center of the visual field. In addition, when the worker selects the icon "next", the printer 3 which shows the event-related information is switched. When the worker selects the icon "return", the printer 3 which shows the event-related information returns to an immediately before printer.

As described above, the control section 71 of the management server 7 displays the event-related information of the printer 3 which is selected from among the plurality of printers 3 based on the direction of the visual field of the worker or the icon manipulation performed by the worker, and does not display the event-related information of the printer 3 for the printers 3 which are not selected. Accordingly, it is possible to narrow down the printer 3, which displays the event-related information, from among the plurality of printers 3, and it is possible to suppress the display of the event-related information from disturbing the visual field of the worker.

In addition, the detailed configurations of the respective display modes which are illustrated in FIGS. 7A and 7B and FIGS. 9A to 9C can be changed in various manners. Accordingly, for example, it is possible to change the shape of the mark which is included in the indicator 9, to change the location of the menu bar 91 to the bottom, right or left side, or, further, it is possible to divide the menu bar 91 into a plurality of parts and to vertically and horizontally arrange the divided parts.

In addition, in the embodiment, a case in which the transmission-type HMD 5 is used as "the portable display device" according to the invention is described as an example. However, it is possible to use a non-transmission type (that is, non-see-through type) HMD 5, which displays peripheral images which are imaged by the cameras 514, as "the portable display device" according to the invention. That is, the HMD 5 may be configured such that the event-related information is displayed to superimpose the imaged result acquired by imaging the periphery including the printer 3 using the camera 514. Otherwise, it is possible to use a smart phone, a tablet, or a laptop computer as "the display device" according to the invention. Imaged results which are imaged by a camera may be displayed to superimpose to the event-related information. In this case, the display mode may be changed according to the size of the printer 3 which is imaged by the camera.

In addition, in the embodiment, the display mode of the event-related information is switched according to the size relation of the detected distance between the printer 3 and the HMD 5 and the threshold. However, the display mode of the event-related information may be continuously changed according to the change in the detected distance.

In addition, although not described above in detail, for example, it is possible to use a technology using an Augmented Reality (AR) marker as the technology which displays the event-related information. Specifically, an AR marker, which is attached to the printer 3, is extracted from an image which is imaged by the camera 514, and the event-related information is displayed in a location in which a predetermined locational relationship with the AR marker is satisfied. Otherwise, display may be performed on the HMD 5 through display control using the markerless AR.

In addition, a case in which the printer 3 is used as "the work object" according to the invention and a worker who executes the work for the printer 3 is supported is described as an example. However, it is possible to preferably use the invention when supporting the work of a worker who works in a medical field, welfare or a construction site.

The entire disclosure of Japanese Patent Application No. 2015-012009, filed Jan. 26, 2015 is expressly incorporated by reference herein.

What is claimed is:

1. A display system comprising:
a portable display device;
a distance detection section that detects a distance between the portable display device and a work object which communicates with the portable display device; and
a display control section that displays work object-related information, which indicates content relevant to the work object, on the portable display device,
wherein the display control section changes a work object-related information display mode in the portable display device according to a result which is acquired in such a way that the distance detection section detects the distance,
wherein, when the distance which is detected by the distance detection section changes in order of a first distance, a second distance which is shorter than the first distance, and a third distance which is longer than the second distance, the display control section causes the display mode in which the work object-related information is displayed according to the detection of the first distance and the display mode in which the work object-related information is displayed according to the detection of the third distance to be different from each other.

2. The display system according to claim 1, wherein the display control section changes a shape of a display area, in which the work object-related information is displayed, according to the distance which is detected by the distance detection section.

3. The display system according to claim 1, wherein the display control section changes the display mode according to a size relation between the distance, which is detected by the distance detection section, and a threshold.

4. The display system according to claim 1, wherein, the display control section causes the display mode in which the work object-related information is displayed according to the detection of the first distance, the display mode in which the work object-related information is displayed according to the detection of the first distance, the display mode in which the work object-related information is displayed according to the detection of the second distance, and the display mode in which the work object-related information is displayed according to the detection of the third distance to be different from each other.

5. The display system according to claim 1, wherein the display control section is configured to handle a plurality of work objects, displays the work object-related information for a work object which is selected from among the plurality of work objects, and does not display the work object-related information for the work objects which are not selected.

6. A display system comprising:
a portable display device;
a distance detection section that detects a distance between the portable display device and a work object which communicates with the portable display device; and
a display control section that displays work object-related information, which indicates content relevant to the work object, on the portable display device,
wherein the display control section changes a work object-related information display mode in the portable display device according to a result which is acquired in such a way that the distance detection section detects the distance,
wherein the display control section changes the work object-related information display mode in the portable display device according to a history of a change in the distance detected.

7. A portable display device comprising:
a display for displaying information related to an object whose image is viewable on the display,
wherein the portable display device communicates with the object for displaying the information on the display, and
the information is displayed upon occurrence of an event in the object,
wherein, if a distance between the portable display device and the object is less than a threshold distance, the display displays an icon which, when selected, is configured to execute a display mode of the information.

8. The portable display device according to claim 7, wherein a display mode of the information is changed based on a distance between the portable display device and the object.

9. The portable display device according to claim 7, wherein the icon is configured to stop being displayed after it is selected.

10. The portable display device according to claim 7, wherein the icon, when selected, is configured to fix the display mode of the information, regardless of the distance between the portable display device and the object.

* * * * *